3,518,232
PROCESS FOR INTERFACIAL POLYMERIZATION OF PYROMELLITIC DIANHYDRIDE AND 1,2,4,5-TETRAAMINO-BENZENE

Vernon L. Bell, Jr., 318 Kingsman Drive,
Newport News, Va. 23602
No Drawing. Filed Nov. 23, 1965, Ser. No. 510,155
Int. Cl. C08g 20/32
U.S. Cl. 260—78                    3 Claims

---

ABSTRACT OF THE DISCLOSURE

This invention relates to a process of producing an interfacial polymerization product of pyromellitic dianhydride and 1,2,4,5-tetraamino-benzene.

---

The invention described herein may be manufactured and used by or for the Government of the United States of America without the payment of any royalties thereon or therefor.

This invention relates to novel polymers and the synthesis thereof and relates with particularity to novel polymers having high degrees of thermal and radiation stability.

Linear polymers of polyamides, polyesters and the like have found wide application in the plastics industry in the form of films, fibers and molded articles. Similarly, there appears to be an ever increasing need in the aerospace and other industries for polymeric materials which have a high order of stability to elevated temperatures and ionizing radiation.

Accordingly, it is an object of the present invention to produce new and novel polymeric materials.

Another object of the present invention is a novel self-supporting flexible film polymer having high degrees of thermal and radiation stability.

Another object of the present invention is the production of a novel polymer ladder structure synthesized from dianhydrides and tetraamines, neither of which have single bonds connecting cyclic groups; that is, the entire cyclic structure is fused between the two reactive anhydride groups and between two pairs of ortho-diamines.

A further object of the present invention is a novel soluble intermediate-stage polymer from which films, fibers and molded articles may be fabricated.

Further objects reside in the novel composition and the processes by which the novel condensation polymers disclosed herein are prepared.

Other objects and many of the attendant advantages of the present invention will be more apparent from the following detailed description and examples appearing hereinafter.

According to the present invention, it has been found that the reaction product of a mixture of aromatic tetracarboxylic dianhydrides and aromatic tetraamines, with two pairs of ortho-diamines, and their respective derivatives achieve the above and other advantageous objects. In a more specific embodiment of the invention, an aromatic tetracarboxylic dianhydride dissolved in a highly polar aprotic solvent, for example dimethylacetamide, dimethyl sulfoxide, dimethyl formamide, or the like, is mixed with an equimolar quantity of a tetraamine dissolved in a like or similar solvent. The resulting mixture may then be readily converted by either thermal or chemical means to fused "ladder" and partial "ladder" structures and recovered as a film or fiber, as so desired.

It has been reasoned that relatively stable or composite polymer chains of this type disclosed herein would appear schematically as at least two linear chains, hooked together along their lengths at frequent intervals in essentially ladder fashion. Thus, a single break in one of the chain links by thermal degradation or the like, will not rupture the composite polymer system and the likelihood that an additional break will readily occur adjacent to the first one is small. Further, the ends of any break in a composite or ladder type polymer are kept in close proximity to each other and are thereby provided with a good opportunity to recombine, in cases where chain scission is an equilibrium process. In polymers which are less stable to heat or ionizing radiation, when a break occurs, the broken ends separate and the damage is permanent.

This theoretical ladder structure can be expanded upon by considering the individual polymer chains to be either a complete ladder or a series of stepladders, with fused rings of from four to infinity being obtainable as determined by the synthesizing components. In this respect, complete ladder polymers can be obtained where the dianhydride groups are on the same cyclic system without the appearance of a single bond occurring between the two anhydride groups and the four amino groups of the tetraamine appear on a single cyclic system. For an exemplary anhydride and tetraamine reaction this would appear as:

$$A + B \rightarrow C$$

where A is selected from the anhydride group consisting of pyromellitic dianhydride (PMDA), naphthalene tetracarboxylic dianhydride (NTDA), cyclopentane tetracarboxylic dianhydride (CPDA) and pyrene tetracarboxylic dianhydride (PYDA) and B is selected from the group consisting of 1,2,4,5-tetraamine benzene (TAB), tetraaminodihydroanthracene (TAA) and 1,4,5,8-tetraaminonaphthalene (TAN) and similar tetraamines with aromatic and heteroaromatic structures. Thus, when reacting PMDA with TAB the following reaction would be expected;

(I)
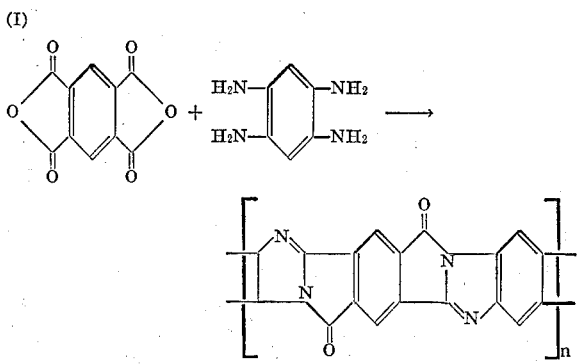

These composites appear as recoverable solids and physical properties of objects fabricated from these exemplary polymers can be expected to be quite rigid, and probably relatively nonflexible due to lack of flexibility in the polymer chains. One manner in which a polymer system of this type may be tailored to render the material more flexible would be to "insert" an occasional single bond into the polymer chain. This would result in a series of "stepladders" making up the polymer chain and is readily accomplishable by using a single bond containing compound for either or both of the dianhydride for tetraamine employed in the synthesis.

For example, a stepladder polymer may be obtained by reacting either a dianhydride from the group consisting of 3,3′,4,4′-benzophenone tetracarboxylic dianhydride (BTDA), bis (3,4-dicarboxyphenyl) ether dianhydride (PEDA), or 1,2,3,4-butane tetracarboxylic acid dianhydride (BUDA) with an aromatic ortho-tetraamine, or reacting an aromatic dianhydride with an aromatic ortho-tetraamine having the general structure of (2) 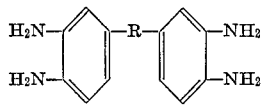

where R may be selected from the substituents —O—, —CH₂—, —CR₂'— —SO₂—, —NR''—, and a single bond joining the two benzene rings, and where R' and R'' are selected from the alkyl and aryl groups. Specific examples of these tetraamines include 3,3'-diaminobenzidine (DAB), 3,3',4,4'-tetraaminodiphenyl ether (TADPO), and 3,3',4,4'-tetraaminodiphenyl methane (TADPM). Thus, an "eight-rung" stepladder polymer may be obtained, for example, by reacting pyromellitic dianhydride with a tetraamine, as shown in Equation 3:

(3) 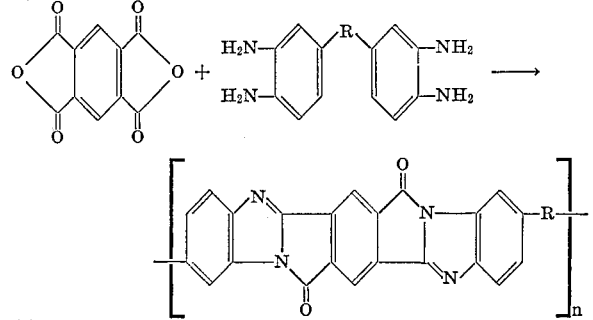

Also, (4) 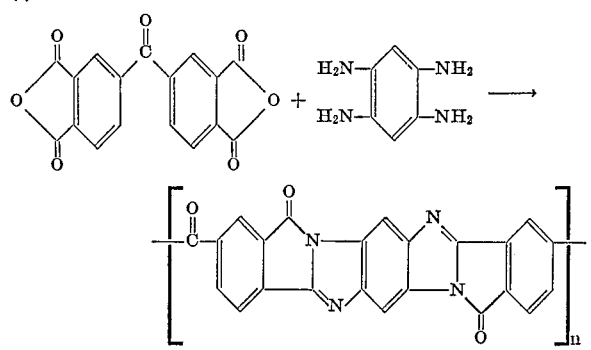

Similarly, "five-run stepladder" polymers may be obtained by reacting a dianhydride and a tetraamine, both of which have one or more single bonds. Note for example the reaction (5) 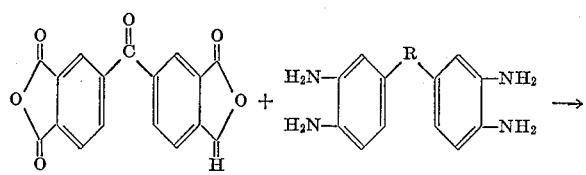

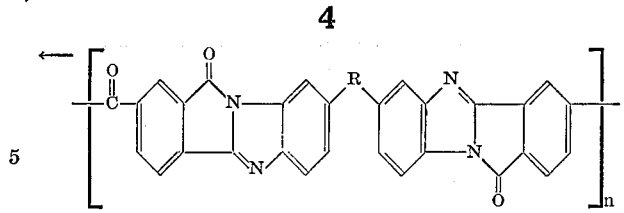

The advantages obtained by these exemplary "tailored" polymers are believed now readily apparent. In addition, the polymerization reactions disclosed herein are obtainable at room temperatures instead of the high temperatures normally expected for polymerizing the polybenzimidazoles, and soluble intermediate polymers are obtained from which films, fibers, and the like may be fabricated. Additionally, the polymer molecular weight and viscosity can be readily built up by selectively adding slight excesses of the dianhydride to thereby link two adjacent chains together. In view of this unique feature, the purity of the starting chemicals is considerably less critical than with previously known polymer systems as, for example, in synthesizing the polyimides an addition of slight excesses of the diamines or dianhydrides leads to degradation and lowering of the end product molecular weight.

In each of the exemplary reactions discussed herein a suitable mutual solvent for the chemicals utilized in the polymerization reactions is employed. These solvents may be selected from the group consisting of dimethylformamide (DMF); N,N-dimethylacetamide (DMAc); dimethyl sulfoxide (DMSO); N-methyl-2-pyrrolidinone (NMP); and tetramethyl urea (TMU).

It is apparent that different types of polymers can be prepared by reactions between dianhydrides and ortho-tetraamines. If a solution of pyromellitic dianhydride is added very slowly to a solution containing a large excess of an orthotetraamine, such as 3,3'-diaminobenzidine, there is a strong likelihood that a polymer with numerous branches can result. This is due to the likely reaction of excess tetraamine with the carboxyl groups which result from the opening of the anhydride rings, to give an ionic amine-carboxylic acid salt. When these ionic salts are heated, water will be lost and covalent amide groups will result, which will, on additional heating, react further with residual ortho-amino groups on the tetraamine moiety to give imidazole cyclic structures. This concept is illustrated in the following reaction scheme:

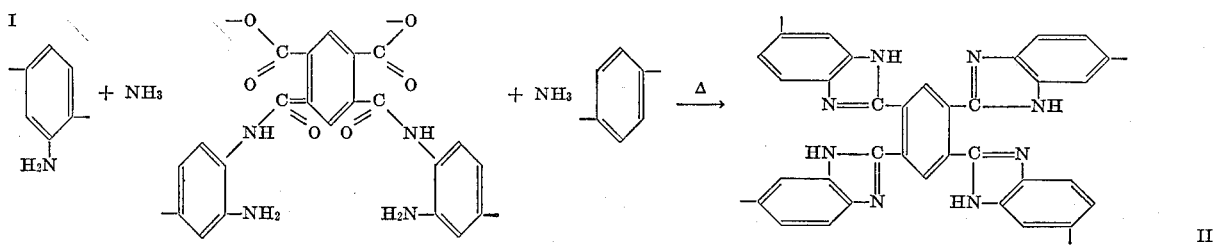

Thus, structure II will be favored when the dianhydride is introduced into the polymer reaction slowly. Structure II represents merely a highly branched or three dimensional poly(benzimidazole) structure as disclosed in U.S. Pat. No. 2,895,948 to Brinker et al. and which is not the intent of this invention. On the other hand, the introduction of the dianhydride to the solution of tetraamine should be as rapid as possible to obtain substantially equivalent molar ratios of the two ingredients, since this will lead to a polymer which is more linear in nature and with less of the branched polybenzimidazole sites (structure II). This linearity, which is desirable in polymer structures for maximum flexibility, is achieved since with equimolar ratios of the two ingredients there will be statistically one anhydride group for each pair of amino groups. Therefore, rapid mixing of the two ingredients is essential to the purpose of this invention, namely the polyimidazopyrrolone structure.

Although thermal treatment of the intermediate stage poly(amide-acidamine) leads to the highly condensed imidazopyrrolone structure, which is the more energetically stable form, certain chemical methods can be used for the same purpose. These chemical methods, which have in common the ability to cyclize the intermediate stage structure with concomitant dehydration, include low molecular weight aliphatic and aromatic acid anhydrides such as acetic anhydride, together with tertiary amines, such as pyridine, trimethylamine and the like. Other cyclodehydrating agents, such as carbodiimides, sulfuric acid and polyphosphoric acid are applicable. Combinations of chemical and thermal processes can also be utilized for the cyclodehydration reactions.

Although the usual forms for the reactants are the dianhydrides and the tetraamines, it should be understood that derivatives of the basic structures can be used. For example, the tetraamines can be utilized in the form of their mono-, di-, tri-, and tetrahydrochloride salts. Likewise, instead of pyromellitic dianhydride certain derivatives such as the pyromellitic acids, amides, esters and acid chlorides as well as combinations of those groups on the pyromellitic nucleus can be employed equally well, providing the conditions of the polymerization are modified to accommodate the derivatives. An illustration of this can be afforded by the use of a tetraamine tetrahydrochloride salt, wherein pyridine is added to the reaction to accept the hydrogen chloride.

Also, where specific materials are used in the specific examples it is to be understood that chemical equivalents may be substituted when so desired. For example, pyromellitic dianhydride may be readily dissolved in any solvent selected from the group consisting of m-, p-, and o-xylene, benzene, toluene, perchloroethylene, carbontetrachloride and chloroform. Similarly, suitable solvents for dissolving the various polymers formed to prepare them for casting include dimethyl formamide, N,N-dimethylacetamide, dimethyl sulfoxide, N-methyl-2-pyrrolidinone and tetramethylurea. Also, where ethyl alcohol is designated as the specific alcohol used to precipitate the intermediate poly(amide-acid-amine), other aliphatic alcohols are equally applicable.

A more complete appreciation of the invention will be better understood by reference to the following examples relating to specific polymers, their chemical and physical property characteristics, and the processes for preparing the polymers.

EXAMPLE I

Polymerization of pyromellitic dianhydride (PMDA) and 3,3',4,4'-tetraaminodiphenyl ether (TADPO):

A solution of 20.7 g. (0.095 mole) of PMDA in 200 ml. of dimethyl formamide (DMF) was added at once to a rapidly stirred solution of 23.0 g. (0.100 mole) of TADPO in 185 ml. of DMF. The resulting relatively viscous solution was stirred for 15 minutes and allowed to cool to near room temperature. A solution of 1.50 g. (0.0007 mole) of PMDA in 15 ml. of DMF was added dropwise to the stirred polymer solution to give a clear, amber solution of high viscosity. The intrinsic viscosity, determined in DMF at 25° C. was 1.55 deciliters per gram, well within the desired range of 0.3–2.0.

EXAMPLE II

Polymerization of pyromellitic dianhydride and 3,3'-diaminozenzidine:

A solution of 20.00 g. (0.092 mole) of pyromellitic dianhydride in 150 ml. of dimethylformamide was added at once to a rapidly stirred solution of 20.00 g. (0.093 mole) of 3,3'-diaminobenzidine in 200 ml. of dimethylformamide in a Waring blender. The resulting thick solution was stirred for 15 minutes after which a portion of a solution of 1.00 g. (0.0048 mole) of pyromellitic dianhydride was added in a slow, dropwise manner. When the viscosity reached the desired level, addition of pyromellitic dianhydride was ceased. The intrinsic viscosity was 1.0 in dimethylformamide at 25° C. The viscous solution was cast onto a glass plate with a doctor knife and dried at 85° C. for one hour in a forced draft oven and then at 225° C. for one hour. The properties of the deep red film were as follows:

| | |
|---|---|
| Tensile modulus (p.s.i.) | 587,000 |
| Elongation (percent) | 4.8 |
| Tensile strength (p.s.i.) | 13,900 |

EXAMPLE III

Polymerization of pyromellitic dianhydride and 3,3',4,4'-tetraaminodiphenylmethane:

A solution of 6.54 g. (0.03 mole) of pyromellitic dianhydride in 50 ml. of dimethylformamide was added at one time to a stirred solution of 6.84 g. (0.03 mole) of 3,3',4,4'-tetraaminodiphenylmethane in 50 ml. of dimethylformamide. There resulted a rapid increase in viscosity of the solution. A portion of a solution of 0.33 g. (0.0015 mole) of pyromellitic dianhydride in 10 ml. of dimethylformamide was added in a slow, dropwise manner until solution of the desired viscosity resulted. This solution was cast onto a glass plate with a 15 mil doctor knife, and the film was dried at room temperature overnight and then at 150° C. for one hour in a forced draft oven. The resulting orange film displayed the following properties:

| | |
|---|---|
| Tensile modulus (p.s.i.) | 534,000 |
| Elongation (percent) | 3.9 |
| Tensile strength (p.s.i.) | 13,900 |

EXAMPLE IV

Polymerization of 3,3',4,4'-benzophenone tetracarboxylic dianhydride and 3,3',4,4'-tetraaminodiphenyl ether:

A solution of 6.440 g. (0.02 mole) of sublimed benzophenone tetracarboxylic dianhydride in 60 ml. of dimethylacetamide was added at one time to a rapidly stirred solution of 4.601 g. (0.02 mole) of 3,3',4,4'-tetraaminodiphenyl ether in 40 ml. of N,N-dimethylacetamide. The mixed solution increased rapidly in viscosity and after stirring for 15 minutes, a very thick polymer solution had resulted. The intrinsic viscosity in dimethylacetamide at 25° C. was 1.5. Red-orange films which were tough, clear and flexible were obtained by casting the polymer solution onto glass plates and drying in a forced draft oven at 85° C. for one hour and 200° C. for one hour.

EXAMPLE V

Polymerization of 3,3',4,4'-benzophenone tetracarboxylic dianhydride and 3,3'-diaminobenzidine:

A solution of 4.83 g. (0.015 mole) of benzophenone tetracarboxylic dianhydride in 40 ml. of dimethylformamide was added at one time to a rapidly stirred solution of 3.21 g. (0.015 mole) of 3,3'-diaminobenzidine in 30 ml. of dimethylformamide. A thick solution resulted which was stirred for 15 minutes after which a portion of a solution of 0.24 g. of benzophenone tetracarboxylic dianhydride in 2 ml. of dimethylformamide was added in a slow, dropwise manner to reach a desired high viscosity level. The polymer solution was cast onto glass plates with a doctor knife and the films were dried overnight at room temperature. Three of the films were dried additionally, one at 85° C. for one hour, one at 150° C. for one hour, and the third at 300° C. for one hour. These films displayed the properties given in Table I:

TABLE I

| Drying Conditions | 85° C. | 150° C. | 300° C. |
|---|---|---|---|
| Tensile modulus (p.s.i.) | 603,000 | 552,000 | 601,000 |
| Elongation (percent) | 4.7 | 5.7 | 4.3 |
| Tensile strength (p.s.i.) | 14,000 | 16,900 | 20,300 |

The results in Table I indicate that the films are not degraded by the high temperatures of drying; on the contrary, the tensile strength increases with drying temperature.

EXAMPLE VI

Polymerization of pyromellitic dianhydride and 1,2,4,5-tetraaminobenzene:

A solution of 1.38 g. (0.01 mole) of 1,2,4,5-tetraaminobenzene in 20 ml. of dimethyl sulfoxide was prepared in a serum bottle equipped with magnetic stirrer and blanketed with nitrogen. To this solution was added, in portions, a solution of 2.18 g. (0.01 mole) of pyromellitic dianhydride in 24 ml. of dimethyl sulfoxide. The last tenth of the solution was added in a slow, dropwise manner. The resulting dark viscous polymer solution was cast onto glass plates and dried for one hour at 85° C. and one hour at 225° C. A clear, stiff, flexible film was obtained which was black by reflected light but a deep red by transmitted light. The infrared spectrum of the film was similar to those for Examples I to V.

EXAMPLE VII

The polymer from pyromellitic dianhydride and 1,2,4,5-tetraaminobenzene was also prepared more conveniently using the tetrahydrochloride salt of the tetraamine, since the free base is readily oxidized by air.

A slurry of 1.42 g. (0.005 mole) of 1,2,4,5-tetraaminobenzene tetrahydrochloride in 12 ml. of N,N-dimethylacetamide and 1.75 g. of pyridine was prepared and blanketed with nitrogen. A solution of 1.09 g. (0.005 mole) of pyromellitic dianhydride in 10 ml. DMAc was added slowly over two hours to the stirred tetraamine solution. A viscous, yellow polymer solution resulted, which was cast onto glass plates. The films were dried at 85° C. for one hour and then at 225° C. for one hour. The resulting clear, deep red films were tough and flexible.

EXAMPLE VIII

Interfacial polymerization of pyromellitic dianhydride and 1,2,4,5-tetraaminobenzene.

A slurry of 1.09 g. (0.005 mole) of pyromellitic dianhydride in 40 ml. of o-xylene was prepared and placed in a blender jar. In a separate flask was prepared a solution of 1.42 g. (0.005 mole) of 1,2,4,5-tetraaminobenzene tetrahydrochloride in 25 ml. of distilled water, and 1.06 g. (0.020 mole) of sodium carbonate was added to the aqueous solution under a nitrogen blanket. When the evolution of carbon dioxide had ceased, 15 ml. of dimethylformamide was added and the resulting aqueous solution was added to the xylene solution with rapid stirring. A dark polymer precipitated immediately, and after stirring the mixture for 15 minutes, the solid was collected by filtration and washed well with aqueous acetic acid, water, and acetone. The acetone-damp polymer could be dissolved in dimethyl formamide to give a viscous polymer solution from which rigid, clear films could be obtained by solvent-casting and subsequent drying.

EXAMPLE IX

A solution of polymer from pyromellitic dianhydride and 3,3'-diaminobenzidine was prepared by the procedure detailed in Example II, using 27.82 g. of diaminobenzidine in 240 ml. of dimethylformamide and 28.85 g. of pyromellitic dianhydride in 240 ml. of dimethylformamide. The resulting viscous polymer solution was cast onto glass plates with a 15 mil doctor knife and the films were dried at 125° C. for one hour and 225° C. for one hour. The resulting clear, deep red, tough films were cut into strips suitable for Instron tests.

A number of these test specimens were irradiated in air with 1 mev. electrons in a Radiation Dynamics Dynamitron at the dose rate of 5,500 megarads per hour. The test specimens were then examined for the effect on physical properties. The results are given in Table II.

TABLE II

| Dose in Megarads: | Modulus (p.s.i.) | Elongation (percent) | Tensile Strength (p.s.i.) |
|---|---|---|---|
| 0 | 902,000 | 8.1 | 21,700 |
| 1,095 | 801,000 | 3.7 | 17,200 |
| 5,470 | 801,000 | 4.3 | 19,000 |
| 10,940 | 853,000 | 4.3 | 20,800 |
| 21,880 | 852,000 | 4.3 | 22,600 |

The results in Table II indicate the extreme radiation stability of the poly(imidazopyrrolones), a property which makes the polymers extremely suitable for such applications as coatings for wiring, protective enamels, molded parts and adhesives for use in nuclear reactors and propulsion units and spacecraft which will encounter high radiation fluxes in outer space.

EXAMPLE X

The polymer solution described in Example IX was painted onto clean copper, titanium, steel and aluminum plates. Solvent was evaporated in an oven at 135° C. for one hour and then at 200° C. for one hour. The clear red coatings adhered well to the metallic substrates, through such tests as bending and impaction.

EXAMPLE XI

The polymer solution of Example IX was painted onto glass-fiber fabric and dried in an oven at 135° C. for one hour. This painting and drying treatment was repeated ten times, and the entire structure was dried 3 hours at 225° C. The result was an extremely rigid red laminate structure which was flexible. Flexing of the specimen demonstrated excellent adhesion of the polymer to the fabric.

EXAMPLE XII

A portion of the polymer solution described in Example IX was poured into ethyl alcohol to precipitate the intermediate poly(amide-acid-amine). The tan powder was collected by filtration, washed with ethanol and dried at room temperature under reduced pressure. The powder was then molded into circular disks, one inch in diameter and from 1/8" to 1" in thickness, using pressures from 100 to 10,000 p.s.i., and temperatures of 25° C. to 300° C. to thereby convert the molded powder into imidazopyrrolone structure. Depending on the temperatures employed, the disks varied in appearance from light yellow to deep red as the degree of conversion to the imidazopyrrolone structure was increased. The disks were very tough, compact, rigid and could be machined with ease. They were highly stable to high temperatures and did not burn with flame, but slowly charred.

EXAMPLE XIII

The retention of useful properties of the poly(imidazopyrrolones) at elevated temperatures was demonstrated in this example. Converted films from a polymer prepared from pyromellitic dianhydride and 3,3'-diaminobenzidine, in the manner of Example II, were tested at 25° C. and also at 200° C. The results are given in Table III.

TABLE III

| | 25° C. | 200° C. |
|---|---|---|
| Modulus (p.s.i.) | 623,000 | 303,000 |
| Elongation (percent) | 2.9 | 6.1 |
| Tensile Strength (p.s.i.) | 13,700 | 8,200 |

EXAMPLE XIV

The intermediate polymers of amide-acid-amine composition can be converted to the condensed poly(imidazopyrrolone) stage by chemical means as well as thermal. This technique is illustrated by the conversion of a quantity of the polymer from Example IX with an acetic anhydridepyridine solution which serves to promote the cyclodehydration reaction usually accomplished by heat.

A five ml. sample of the polymer solution from Example IX was placed in a bottle and cooled in an ice-salt bath (−20° C.). Then a mixture of 0.65 ml. of acetic anhydride and 0.65 ml. of pyridine were added, with brief stirring, and the entire solution was cast onto a glass plate. This film gelled within 3 minutes and was allowed to dry overnight at room temperature. The resultant red film was then heated at 150° C. in a forced draft oven for one hour. The resulting film was tough, clear and flexible, and was identical in all respects to thermally-cured films.

From the foregoing description and specific examples, it is readily apparent that the novel "pyrrone" polymers disclosed herein are readily useful as adherent coatings for metal and like surfaces; may be used alone or in combination with glass fibers, and the like, to provide reinforced structural configurations that adequately resist thermal and radiation degradation thereby providing good thermal and radiation protective surfaces for spacecraft and the like.

A summary of the preparation for the specific examples and the conversion process, when employed, is readily apparent from the following table:

TABLE IV.—POLYAMIDE-ACID-AMINE PREPARATION

| Example | Reactants | Solvent | Conversion |
| --- | --- | --- | --- |
| I | TADPO, PMDA | DMF | |
| II | DAB, PMDA | DMF | 225° C./1 hr. |
| III | TADPO, PMDA | DMF | 150° C./1 hr. |
| IV | TADPO, BTDA | DMAc | 200° C./1 hr. |
| V | DAB, BTDA | DMF | 300° C./1 hr. |
| VI | TAB, PMDA | DMSO | 225° C./1 hr. |
| VII | TAB·HCl, PMDA | PY | 225° C./1 hr. |
| VIII | TAB·HCl, PMDA | {DMAc, Xylene, Water, DMF} | |
| IX | DAB, PMDA | DMF | 225° C./1 hr. |
| XIV | DAB, PMDA | DMF | Chemical. |
| X-XII | (Specific applications for the polymer of IX.) | | |
| XIII | (Specific application for the polymer of II.) | | |

The specific novel polymer examples, their uses, and the methods of preparing these exemplary polymers as given herein are merely to illustrate applicant's invention and are not to be considered as limitations thereon.

Obviously, there are many variations and modifications of the present invention in the light of the above teachings. It is therefore to be understood that within the scope of the appended claims the invention may be practiced otherwise than as specifically described.

What is claimed as new and desired to be secured by Letters Patent of the United States is:

1. A process of producing an interfacial polymerization product of pyromellitic dianhydride and 1,2,4,5-tetraaminobenzene comprising:
   mixing, at room temperature, substantially equimolar quantities of pyromellitic dianhydride and 1,2,4,5-tetraaminobenzene tetrahydrochloride,
   said pyromellitic dianhydride being previously dissolved in a water immiscible solvent selected from the group consisting of o-, m-, and p-xylene, benzene, toluene, perchloroethylene, carbontetrachloride and chloroform, and said 1,2,4,5-tetraaminobenzene tetrahydrochloride being prepared in aqueous solution by first adding a quantity of sodium carbonate to the aqueous solution while maintaining the solution under a nitrogen blanket and, adding a quantity of dimethylformamide,
   rapidly stirring the combined solutions, and
   recovering a polymer precipitate by filtration.

2. A method of recovering a poly(amide-acid-amine) polymer in powder form comprising:
   dissolving substantially equimolar quantities of pyromellitic dianhydride and 3,3'-diaminobenzidine in a mutual solvent and combining these solutions to form a polymer solution,
   combining the polymer solution with ethyl alcohol to precipitate the intermediate poly(amide-acid-amine),
   collecting the powder precipitate by filtration,
   washing the precipitate with ethyl alcohol, and
   drying the recovered precipitate at room temperature and under reduced pressure.

3. A method of preparing a molded imidazopyrrolone polymer object comprising:
   molding the dry poly(amide-acid-amine) polymer powder recovered in the method of claim 2 using mold pressures in the range of from 100 to 10,000 p.s.i. and mold temperatures in the range of from 25° C. to 300° C. to thereby convert the molded powder into imidazopyrrolone structure, whereby the final molded imidazopyrrolone structure has the physical property characteristics of being tough, compact, rigid, highly stable at high temperatures, flame-resistant and readily machineable.

References Cited

UNITED STATES PATENTS 3,414,543    12/1968    Paufler _____ 260—47

OTHER REFERENCES

Dawans et al., Polymers from Ortho Aromatic Tetraamines and Aromatic Dianhydrides, Journal of Polymer Science, part A, vol. 3, pp. 3549–50, and 3565–3569, Nov. 8, 1965.

WILLIAM SHORT, Primary Examiner

L. L. LEE, Assistant Examiner

U.S. Cl. X.R.

260—47, 65, 78.4